United States Patent
Heider et al.

(10) Patent No.: US 7,283,902 B2
(45) Date of Patent: Oct. 16, 2007

(54) TRANSFER OF AT LEAST ONE PERSONAL SETTING OF A VEHICLE

(75) Inventors: Andreas Heider, Munich (DE); Thomas Stauner, Unterschleissheim (DE); Alexandre Saad, Eching (DE); Astrid Schroeder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/486,029

(22) Filed: Jul. 14, 2006

(65) Prior Publication Data

US 2007/0038345 A1 Feb. 15, 2007

Related U.S. Application Data

(63) Continuation of application No. PCT/EP04/00187, filed on Jan. 14, 2004.

(51) Int. Cl.
*G06F 19/00* (2006.01)
(52) U.S. Cl. ............................................ 701/49; 701/36
(58) Field of Classification Search .................... None
See application file for complete search history.

(56) References Cited

U.S. PATENT DOCUMENTS

| | | | | |
|---|---|---|---|---|
| 6,182,006 B1 * | 1/2001 | Meek | ......................... | 701/200 |
| 6,198,996 B1 * | 3/2001 | Berstis | ......................... | 701/36 |
| 6,335,576 B1 * | 1/2002 | Wallace | ..................... | 307/10.2 |
| 6,622,083 B1 * | 9/2003 | Knockeart et al. | ........... | 701/202 |
| 6,625,503 B1 * | 9/2003 | Smith | ............................ | 700/83 |
| 6,665,600 B2 * | 12/2003 | Miller et al. | .................... | 701/49 |
| 6,675,082 B2 * | 1/2004 | Galli et al. | ...................... | 701/49 |
| 7,036,738 B1 * | 5/2006 | Vanzini et al. | ............... | 235/486 |
| 2001/0049569 A1 | 12/2001 | Gehrke | | |
| 2002/0069002 A1 * | 6/2002 | Morehouse | ................... | 701/35 |
| 2003/0171863 A1 | 9/2003 | Plumeler et al. | | |

FOREIGN PATENT DOCUMENTS

| | | |
|---|---|---|
| DE | 198 40 955 A1 | 3/2000 |
| DE | 100 39 756 A1 | 2/2002 |
| EP | 0 635 800 A1 | 1/1995 |
| EP | 1 138 561 A2 | 10/2001 |
| WO | WO 2004/074047 A1 * | 9/2004 |

* cited by examiner

*Primary Examiner*—Michael J. Zanelli
(74) *Attorney, Agent, or Firm*—Crowell & Moring LLP

(57) ABSTRACT

A method is provided for transferring at least a first personal setting of a first vehicle to a second vehicle, especially for a driver, who changes the vehicle. To transfer the vehicle settings that are known to the driver as true to the original as possible from a first vehicle to a second vehicle, thus without falsifying the subjective impression, first personalization data indicating the personal first setting is exported from the first vehicle in the original form or in a modified form in a first step and is imported into the second vehicle in a second step. The second personalization data are formed based on the imported data; and a personal setting is carried out with the second personalization data in the second vehicle, wherein the model and/or the accessories of the first and second vehicle may be identical or different.

20 Claims, 1 Drawing Sheet

TRANSFER OF AT LEAST ONE PERSONAL SETTING OF A VEHICLE

CROSS-REFERENCE TO RELATED APPLICATIONS

This application is a continuation of PCT International Application No. PCT/EP2004/000187, filed on Jan. 14, 2004, the entire disclosure of which is expressly incorporated by reference herein.

BACKGROUND AND SUMMARY OF THE INVENTION

The invention relates to a method, a system and a computer program product for transferring at least a first personal setting of a first vehicle to a second vehicle, in particular for a driver, who changes vehicles.

The prior art discloses a method for securing personalization data with an external diagnostic device in the workshop. The diagnostic device reads the data from the controller of a vehicle and then imports this data into a newly installed controller or into the controller provided with updated software. A conversion of the data does not take place.

A transfer or porting of data to different vehicles is neither possible nor provided. Two controllers are "different," when they do not exhibit the same amount of personalization data (i.e., a plurality of different setting options); or the controllers interpret the same data differently. As a rule, controllers with, for example, different parts numbers may be regarded as different. Moreover, there are also no confidentiality or security measures against an improper exchange of data. The current security relies on the fact that access by arbitrary persons to the vehicle and to the diagnostic device is not possible.

The porting of data between vehicles of different series is also neither provided nor possible in the known state of the art.

The object of the invention consists particularly of providing a method, by which the vehicle settings known to the driver from a first vehicle are transferred as true to the original as possible to a second vehicle.

This problem is solved by providing a method for transferring at least a first personal setting of a first vehicle to a second vehicle, in particular for a driver, who changes vehicles. The first personalization data indicating the personal first setting is exported from the first vehicle in the original form or in a modified form in a first step. And, the first personalization data is imported into the second vehicle in a second step. The second personalization data is formed based on the imported data. A personal setting is carried out with the second personalization data in the second vehicle, whereby the model and/or the accessories of the first and second vehicle are identical or different. Advantageous embodiments of the invention are described and claimed herein.

According to a first important aspect of the invention, first personalization data indicating the personal first setting are exported from the first vehicle in the original form, or in a modified form, in a first step. In a second step, the data are imported into a second vehicle; and second personalization data are formed based on the imported data; and a personal setting is carried out in the second vehicle.

This has the advantage that the model and/or the accessories of the first and the second vehicle are identical, but may also be different.

The term personalization data includes the data for settings in the vehicle that may be made by or for a person using this vehicle. Some examples are data relating to the seat adjustment, the radio volume level, the navigation destination lists, and settings of alarm systems and unlocking, as well as current CKM (car key memory). In addition, personalization data may also include rules, which are used for setting the settings or for influencing the vehicle functions (active data). An example is a rule that formalizes so as to be machine readable that the vehicle switches on the low beam headlights as soon as the vehicle speed exceeds 100 km/h. Furthermore, personalization data may also include programs that can be executed in the vehicle, e.g., in the form of machine-independent Java byte code. Even personal services implemented in software, such as an automatic seat adjustment function, fall within the scope of personalization data.

One advantageous embodiment of the invention provides that the first personalization data are converted into a vehicle-independent data format. The personal settings are carried out in the second vehicle with the aid of the data in the vehicle-independent data format.

Another advantageous embodiment of the invention provides that the first personalization data are exported from the first vehicle in a form that permits the model of the first vehicle to be recognized. With the aid of these data, the personal settings are carried out in the second vehicle.

Each of the two alternatives makes it possible in an advantageous, flexible manner to match the data indicating the setting in the source vehicle (or rather in the first vehicle) with data that triggers in the destination vehicle a setting that is as true to the original as possible or when changing vehicles matches a setting that the driver or the passengers generally expect.

As an alternative or in addition to the above, another advantageous embodiment of the invention provides that the personalization data, which are exported from the first vehicle in the original form or in a modified form, and/or the first personalization data, which are converted into a vehicle-independent data format, and/or the first personalization data, which exhibit a form that permits the model of the first vehicle to be recognized, are encoded and/or signed. Preferably, the encoding and signature are implemented with the public-key method.

These measures can ensure both the confidentiality of the personalization data and their authenticity. Confidential personalization data may include, for example, names, telephone numbers and addresses from a contacts database (telephone or address software application).

As an alternative or in addition to the above, a preferred embodiment of the invention provides that the first personalization data are retrieved from at least a first controller of the first vehicle and/or from a first central database, provided in the first vehicle, prior to their export. The second personalization data, which have been formed based on the first personalization data, are fed or will be fed to at least a second controller of the second vehicle and/or a second central database provided in the second vehicle.

Another advantageous embodiment of the invention is characterized in that the second personalization data are formed from the first personalization data with the use of a table, a matrix, or another allocation specification, in particular a table, which takes into account the vehicle models, which may or may not be different.

Another embodiment of the invention provides that the first personalization data are combined with other personalization data into one group and then jointly encoded and/or signed.

Other objects, advantages and novel features of the present invention will become apparent from the following detailed description of the invention when considered in conjunction with the accompanying drawings.

DETAILED DESCRIPTION OF THE DRAWING

Figure 1:
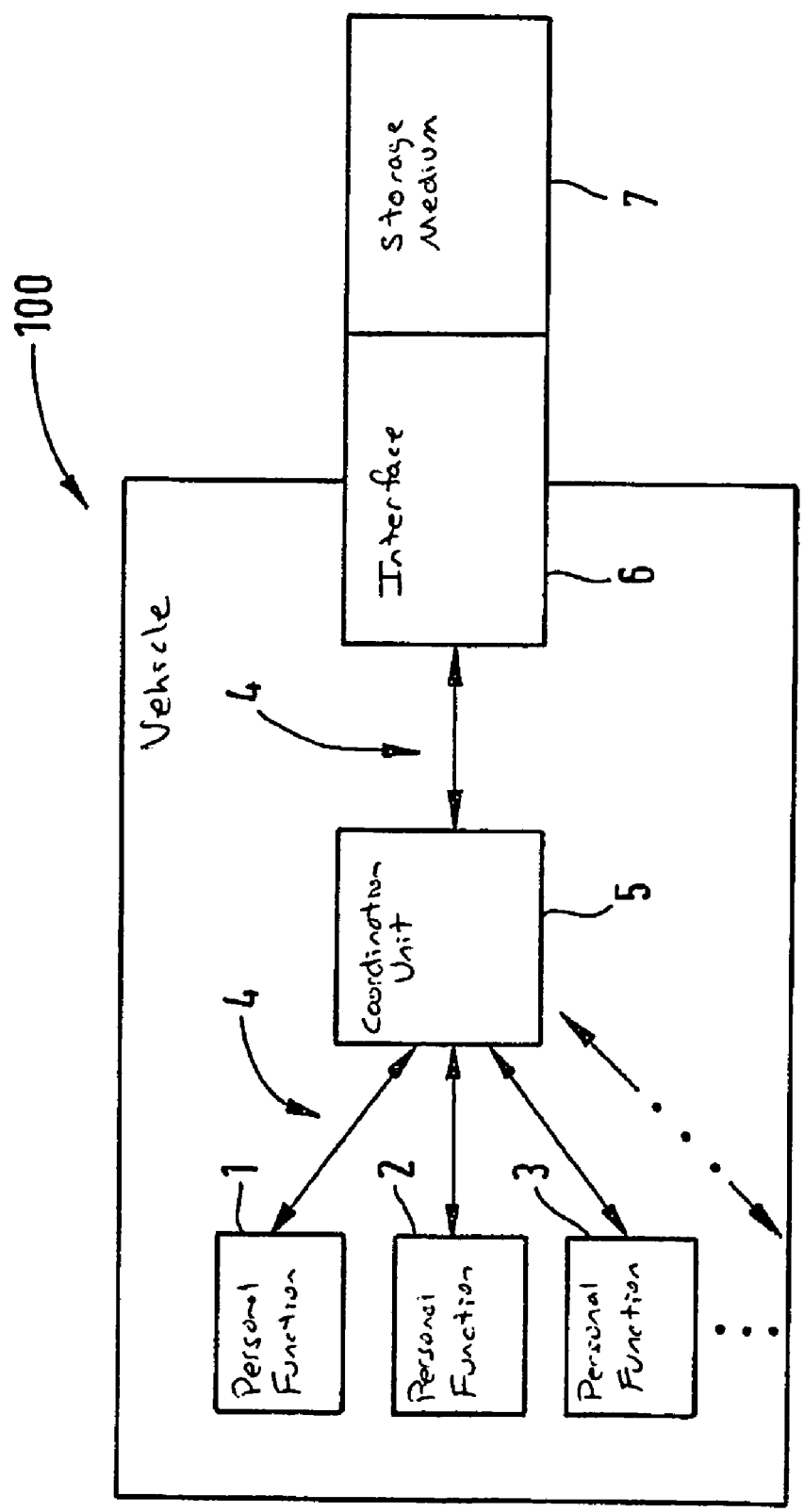
FIG. 1 is a schematic block diagram illustrating the exchange of personalization data between vehicles according to the present invention.

The inventive export and import algorithm, the conversion and data protection method, the porting, the data security, the data transfer and the advantages of the invention shall be described in detail below with reference to the embodiments.

In general, the invention proposes a method, which retrieves preferably personalization data in the vehicle, converts that data from a vehicle-dependent data format, used internally in the vehicle, into a portable, vehicle-independent format and ensures its protection as a function of the safety relevance of the data. The method may also convert the data in this protected export format again into the vehicle-dependent, internal format of another vehicle, and make it available to this vehicle. The conversion is carried out preferably in such a manner that, in so doing, the data are adapted to the destination vehicle in a way that matches the setting in the source vehicle as true to the original as possible.

The export algorithm exhibits the following steps:
1. Retrieval of the data from the controller or from a central database in the vehicle.
2. Conversion to an external format or with the aid of a table in the destination vehicle and identifying or rather attributing the data with information for further treatment when importing.
3. Optionally encoding and signature of the data, as a function of the transmission path and the protection requirements of the data concerned; prior to encoding, the data may also be grouped, e.g., according to the scale of the protection requirements.
4. Writing to a data carrier and/or rather transfer to the transmission path.

The import algorithm has the following steps:
1. Read from the data carrier (in the event of a direct on-line connection between the source vehicle and the destination vehicle, as the "medium," the writing in the destination vehicle and the reading in the source vehicle coincide).
2. Optional authentication, encoding and signature checking.
3. Conversion to an internal format or conversion with the aid of a table.
4. Transmission of the data to the controllers or to a central database in the vehicle that sends the settings to the controllers (If necessary, some data from the database are not passed on to the controllers. This is the case when there is no corresponding controller, but the data are supposed to be kept for future export. This is described in more detail below).

A preferred conversion and data protection process of the aforementioned steps 2 and 3 is described in detail below with the aid of a pseudo code.

The starting point is a list Internal-list of the personalization data, stored in the vehicle, a function internal, which indicates with respect to each list element the related value value, related import and export conversion functions exp-konv (in the source vehicle) and imp-konv (in the destination vehicle), functions for securing the data security when importing and exporting exp-secure (in the source vehicle) and imp-secure (in the destination vehicle). The functions for securing the data security require—as a function of the algorithm—other parameters, like keys and passwords, which are not reproduced in the following code.

The data export in pseudo code:

```
li=internal-list;
external-list = empty-list;
while not (li = empty-list) do {
   in=internal(li.head);
   if not (in.exp-secure==nil or in.exp-konv==nil) then
       ext-element=in.exp-secure(in.exp-konv(in.value));
   else throw missing-export-routine-exception;
   li=li.tail;
   external-list = append(external-list, ext-element)
}
```

The terms head, tail, empty-list and append from the above code refer to the standard list operations: first element of the list, list without first element, empty list and appending an element to a list.

The list external-list is defined with the aid of the algorithm and contains all personalization data, which are secured, if desired, with the aid of data protection mechanisms and are encoded in export format. The list may be written to the data carrier in any (but uniform between all vehicles) coding (XML, TLV, . . . ).

Data, for which there are no specific conversion functions, are exported unchanged. The details will be described below.

The data import in the pseudo code:

```
li=external-list;
internal-list = empty-list;
while not (li = empty-list) do {
   in=internal(li.head);
   if not (in.imp-secure==nil or in.imp-konv==nil) then
      int-element=in.imp-konv(in.imp-secure(li.head));
   else throw missing-import-routine-exception;
   li=li.tail;
   internal-list = append(internal-list, int-element)
}
```

The list internal-list is defined with the aid of the algorithm in order to supplement the data in the internal format of the destination vehicle (cf. in.value in the export algorithm).

The actually applied data protection method and conversion may depend on the specific data; and consequently the methods may also deviate, of course, from the embodiments that are presented here.

As an alternative, individual settings that are to be transferred to the destination vehicle, may be combined into groups. This may be achieved in the code by breaking up the while-loop into two separate loops—one for conversion and one for security functions. Then, between the two loops the list may be resorted and the elements may be combined (e.g., according to the security requirements). Then, the function internal must also be broken up into two functions—one that indicates the conversion function for the elements of the list and one that indicates the security functions for the elements of the list.

This alternative eliminates the necessity of having to make the data security mechanisms specifically for each data element, and makes it possible to provide uniform mechanisms for groups of data. For the sake of a clearer overview, this option was not shown in the code.

The use of lists makes it possible to expand by the amount of the new personalization data. List elements may also be configured into a hierarchic structure.

The following comments are intended for a better understanding. For the purpose of an implementation (that is simpler to understand, but not so easy to expand) with arrays, instead of the function internal, and with a fixed number of consecutively numbered elements, instead of lists, the implementation would be as follows:

for the data export:

for i=0 to n do external-array[i]=exp-secure[i](exp-konv[i] (internal-array[i]));

for the data import:

for i=0 to n do internal-array[i]=imp-konv[i](imp-secure[i] (external-array[i]));

The porting is described in detail below with the aid of embodiments and in particular first in accordance with a first alternative in the form of a context-independent exchange format and then in accordance with a second alternative in the form of an exchange format with context information.

Alternative 1: Context-Independent Exchange Format

One manner of transferring the personalization data is in the conversion of the setting values from the vehicle-specific or controller-specific format of the source vehicle (or rather the export vehicle) into a vehicle-independent format, with a subsequent additional conversion from the vehicle-independent format into the vehicle-dependent format of the destination vehicle (or rather the import vehicle) when importing. Within the scope of this embodiment, the following action is proposed.

Porting algorithm when exporting (function exp-konv):

The following cases must be distinguished:

1. Real-Valued Data Element is Not in Si Format:

In the event that a setting value has a range of values that is a subset of the real numbers and is not measured in a unit that can be mapped (or rather converted) into an Si format (international standard format), the value has to be converted into a suitable exchange format that must be specified specifically for each personalization data element.

One way to do this is to convert into a generally valid (=valid for all vehicles) export unit. Example: "Rotations servomotor seat" converted to "distance seat relative to steering wheel."

Another manner of converting into an exchange format is to form a relative value rel from the absolute setting value abs: rel=(abs*100)/(y−x), where the interval [x . . . y] represents the range of value of the setting value. This can be applied, when the ranges of values of the source vehicle and the destination vehicle have the same distance function, e.g., when both are defined linearly or both are defined logarithmically. This conversion supports the transformation between the ranges of values having different discrete rendering. The information about the source vehicle's distance function, e.g., in logarithmic or linear terms, must also be exported in this case, just as the information about the expansion of the range of values. This information must be suitably evaluated when importing.

Then, the value is added to the porting profile in both the original format and the exchange format.

2. Real-Valued Data Element is in Si Format:

In the event that the setting value has a range of values that is a subset of the real numbers and is in a unit that may be mapped into an Si format, the setting value is converted into the Si format, before the setting value(s) is/are exported. Therefore, in this case the Si format represents the exchange format.

It must be noted with respect to (1.) and (2.) that there may also be setting values, the range of which consists of n-tuples, the components of which are real numbers. If n is a natural number, then an n-tuple has n so-called components. Each component is a specific value. For example, a 3-tuple has 3 components: the component 0, the component 1 and the component 2. In this case the values, represented by the n-tuples, must also be converted into a suitable exchange format (e.g., an existing standard format), before they are exported. In this case, too, the values must be added to the porting profile both in the original format and in the exchange format.

It should be noted that with respect to (1.) and (2.) above, a setting value with a range of values that is a subset of the real numbers (or its range of values comprises n-tuples, the components of which are real numbers) is called "real"; and the attribute type of porting in the data format must be set to real.

3. Data Element is Not Real-Valued:

For all other setting values, the value must be exported unchanged, i.e., added to the porting profile. The attribute type of porting must be set to non-real.

4. Personalization Data from the Previous Import Events:

Other personalization data, which have been stored persistently in the exporting vehicle, but have not been used (save value from the attribute import-persistence when previously importing, see below), are exported unchanged, i.e., with all of their unchanged attributes.

5. Other Personalization Data:

As addressed above, not only the setting values but also other personalized data may be ported, such as a) personal data, such as addresses, appointments, pieces of music;

b) personally assigned software (applications/services, like Word or also controller software, of which the customer bought, for example, an especially high grade version, as a special accessory); and c) authorization, especially with respect to the scope of use, the period of use, the frequency of use, and transferability of use, to use software that may already exist in the vehicle and is released with the porting process or owing to authorization may be loaded from a server.

These personalized data are added unchanged to the porting profile. In the case of (a) a conversion into a suitable exchange format may also take place, e.g., into an existing standard format—that is, a format that is supported by several applications that can process data of the type (a).

6. Rules as Personalization Data

A dynamic form of personalization may be achieved with the aid of rules. A rule may be expressed, e.g., in the following notation:

IF<Condition=TRUE>THEN<Actionlist>
<Condition> is a Boolean expression, which may cover the (aggregated) data and the metadata of the vehicle, of the vehicle environment, or of the driver.
<Actionlist> is a list of arbitrary vehicle functions that are executed as soon as the condition is fulfilled. Interdependence between rules is also possible.

EXAMPLES

IF (speed>=100 km/h) THEN ChangeDisplayMode ( )
IF (vacation trip=TRUE) THEN DisableBusinessNumbers ( )
IF (drive tired AND temperature in the car>20 degrees) THEN SetAirCondition (On, 15 degrees, Max); Radio (On, Loud)

The rules may be attributed and exported. When importing it must be checked whether in principle the rules may be evaluated in the destination vehicle. If not, then a discard or save may ensue. If rules may be interpreted, it must be checked whether the values in the condition exist in the destination vehicle and whether the functions of the function list exist and can be carried out with the parameters. If yes, these rules may be applied in the destination vehicle. If not, interdependence between other rules must be checked. In this case, a discard or save may also ensue.

Rules represent a powerful concept for dynamic personalization and are comparatively easy to export and to transfer to a destination vehicle.

Other attributes of the exported personalization data are noted below.

In addition to the actual personalization data element, the function exp-konv also returns the value for the attribute import-persistence, which is a part of each personalization data element. The value save of this attribute indicates that the data element is to be stored persistently (e.g., in a file system or a database), if the related vehicle function does not exist in the destination vehicle. This enables the transfer of personalization data even over vehicles that do not support all possible personalization data. The value discard indicates for the attribute that the personalization data element is discarded in the destination vehicle and is not stored for re-export, if the related vehicle function does not exist in the destination vehicle.

Note: A logical presetting for the attribute import-persistence is to allocate discard to all setting values. Save is assigned solely to the data described above under (a), (b) and (c).

Another attribute import-compatibility, which files exp-konv with the personalization data element, governs the treatment of the data element in the event that the import vehicle has a modified version of the personalized setting. That is, for example, the exported value is outside the import vehicle's range of values for the data element concerned. The attribute may assume the following three values: autoMatch(tol), inquiry and no action (explained below).

autoMatch(tol): If an imported value is not included in the destination vehicle's range of values, then in the event of a range of values that is a subset of the real numbers, the closest value (i.e., the next defined neighbor—in the event that there are several, a value is chosen) is set, if this value does not differ from the value that is to be actually set by more than tol units. If said value differs markedly, an inquiry is conducted.

Inquiry: If a value is not in the range of values, then in the event of a range of values with a defined distance function the user is shown the closest value—otherwise all available values that may be chosen. A range of values without a distance function would be, for example, the range of values for the alarm system setting. In this case the values would be, for example: on, off, and automatically on at night.

no action: Nothing is done.

Note: A logical presetting for the attribute import-compatibility is to assign inquiry to all setting values that are of the non-real type. Setting values of the real type are assigned autoMatch(tol), where the respective matching values for tol must be specified. Other personalization data, as described above under (a), (b) and (c), are assigned autoMatch(tol) (see also below).

In summary the following attributes are linked with an exported personalization data element.

Type of porting (values: real, non-real), import-persistence (values: save, discard), import-compatibility (values: autoMatch(tol), inquiry, no action).

Porting algorithm when importing (imp-konv function):

If the vehicle function, to which the personalization data element belongs, does not exist in the destination vehicle, a treatment is carried out that is indicated in the attribute import-persistence, i.e., persistent storing or discarding.

If the vehicle function, to which the personalization data element belongs, is present in the destination vehicle, the course of action is as follows.

1. Real-Valued Data Element is Not in Si Format:

For a setting value of the type real that was not filed in an Si unit, the original value is chosen, if the destination vehicle has the same version (in particular also the same range of values) of the vehicle function. Otherwise, the exchange format is converted into the format that is valid in the destination vehicle, before the value is set. If, in so doing, there is information about the distance function with respect to a value, it must be checked whether this information is compatible with the distance function in the destination vehicle. That is, it must be checked whether it is the same distance function. If it is not the same distance function, the values are not set. No further action takes place.

2. Real-Valued Data Element is in Si Format:

Setting data of the type real that were filed in an Si unit are converted into the unit that is valid in the destination vehicle, before the setting values are set.

3. Data Element is Not Real-Valued:

For all other setting values (porting type non-real), the value transferred to the porting profile is taken over unchanged.

If (irrespective of any of the three aforementioned cases) the value cannot be taken over, because the ported value does not match a valid value of the range of values (different version of the vehicle function in the destination vehicle), then an exceptional treatment must be carried out that is indicated in the attribute import-compatibility (see above).

For reasons relating to accessibility, if the number of queries, motivated by the attribute value inquiry for import-compatibility, exceeds a specific value, then the import of these values is no longer applicable. In this case only the other values are set; and a message of the nature ("import of all values not possible, vehicle configuration too different") is sent.

4. Other Personalization Data:

For other personalization data (i.e., those that are not pure setting values) that were ported, such as:

a) personal data, such as addresses, appointments, pieces of music;

b) personally assigned software; and/or c) authorization to use software;

the following is checked when importing:

a) Whether the vehicle has software applications that can process the data (e.g., Outlook). This procedure is equivalent to checking the existence of a vehicle function in the event that a setting value is ported. In the positive case, the data are sent to the corresponding software application. This is equivalent to setting or taking over a setting value. In the negative case, it is checked whether there is a software application that can process the data in a format that is compatible with the format in which the data exist. In this case, the treatment that was described with respect to the attribute import-incompatibility is carried out. In this case autoMatch(tol) means that the data are converted into a format supported by the existing application, before they are sent to the respective application (in this case tol must be ignored).

As an alternative, the data may also already exist—when exporting—in a standard format that is supported by several applications, if such a format exists. If there is absolutely no application that can process the data, or if a conversion cannot be carried out, for example, because there is no appropriate converter, the treatment that is indicated with respect to the attribute import-persistence is carried out.

b) Whether the imported software is system-compatible, i.e., whether it is compatible with the configuration in the destination vehicle. For example, it is checked whether there is suitable hardware and/or a suitable operating system. This is equivalent to checking the existence of a vehicle function in the event that a setting value is ported. In the positive case, the software is sent to the corresponding controller or the like and then installed. This is equivalent to setting or taking over a setting value. If the imported software is not immediately compatible with the configuration in the destination vehicle, because, for example, there may be a controller, but the software is not adapted to the controller or the operating system of the controller, then the treatment indicated with respect to the attribute import-incompatibility is carried out. In this case autoMatch(tol) means that a compatible version of the software, compatible, for example, with the existing hardware and/or the existing operating system, is loaded, for example, from a server; in this case tol must be ignored. This version is then sent to the respective controller and then installed. If the software is absolutely incompatible with the configuration in the destination vehicle, because, for example, there is no suitable controller in the destination vehicle or no suitable software version can be loaded, then the treatment indicated with respect to the attribute import-persistence must be carried out.

c) Whether the vehicle has a software application (for example, a so-called vehicle security manager) that can process the authorizations. This is equivalent to checking the existence of a vehicle function in the event that a setting value is ported. In the positive case, the data are sent to the corresponding software application. This is equivalent to setting or taking over a setting value. If there is absolutely no application that can process the data, then the treatment indicated with respect to the attribute import-persistence is carried out. If there is an application that can process an authorization format, then one proceeds in a manner analogous to the course of action taken for the treatment of import-incompatibility in case (a).

5. Rules as Personalization Data:

A dynamic form of personalization may be achieved with the aid of rules. A rule may be expressed, e.g., in the following notation:

IF<Condition=TRUE>THEN<Actionlist>

<Condition> is a Boolean expression, which may cover the (aggregated) data and the metadata of the vehicle, of the vehicle environment, or of the driver.

<Actionlist> is a list of arbitrary vehicle functions that is executed as soon as the condition is fulfilled. Interdependence between rules is also possible.

EXAMPLES

IF (speed>=100 km/h) THEN ChangeDisplayMode ( )

IF (vacation trip=TRUE) THEN DisableBusinessNumbers ( )

IF (drive tired AND temperature in the car>20 degrees) THEN SetAirCondition (On, 15 degrees, Max); Radio (On, Loud)

The rules may be attributed and exported, as in the case of the other personalization data, addressed above under point (a). When importing, it must be checked whether in principle the rules may be evaluated in the destination vehicle. If not, then a discard or save may ensue. If rules may be interpreted, it must be checked whether the values in the condition exist in the destination vehicle and whether the functions of the function list exist and can be carried out with the parameters. If yes, these rules may be applied in the destination vehicle. If not, interdependence between other rules must be checked. In this case, a discard or save may also ensue.

Rules represent a powerful concept for dynamic personalization and are comparatively easy to export and to transfer to the destination vehicle. The problem of an import-Mismatch arises in the same way as in the case of the setting values and may be treated as described when importing.

Alternative 2 To Alternative 1 (Context-Independent Exchange Format): Exchange Format with Context Information As an alternative to the above context-neutral mapping of setting values, there is also the possibility of using a mapping table regarding functions and context (vehicle model or controller, etc.) and containing the setting values. For example, a comparable seat position may be defined irrespective of the vehicle model, or a comparable loudness level may be defined irrespective of the various audio systems. A number of reference values (e.g., seat positions, loudness level etc.) may be filed in the table as a function of the type of value of the setting value in order to enable an interpolation. This mapping table contains the set including the subset of all functions that may be personalized in an arbitrarily equipped vehicle and is provided with the related context information. This mapping table is expanded, if desired, by new functions or new context and serviced by the automobile manufacturer.

The mapping table is used for export and import as follows. With reference to the exp-konv function, not only the setting values but also the relevant context information are also exported. Then a "Table-Lookup" in the mapping table may ensue either externally if the context information of the destination vehicle exists in order to describe the setting values in the destination vehicle, or this can take place in the destination vehicle itself. To this end, an updated mapping table must also be transferred to the vehicle during the imp-konv process. In the simplest case, a function has the same context; and the setting value may be taken over straight away. Otherwise (import-mismatch) is the new setting value to be identified and/or interpolated with the aid of the Table-Lookup. All other aspects of export and import may be used as described above (inquiry, discard, etc.).

In particular, it affects the course of action, if an (automatic) mapping is not possible, because, for example, a new personalizable function exists in the destination vehicle or because, for example, a personalizable function existing in the source vehicle is missing in the destination vehicle.

Alternative 2 may also be added to alternative 1. That is, both alternatives may be converted together as a variant of the automatic matching for the individual personalization data.

Security requirements during the exchange of personalization data: The security requirements during the exchange of personalization data include, first of all, that the confidentiality of these data is guaranteed; secondly that they cannot be manipulated by unauthorized persons; and thirdly the checking of the authorization of the vehicle user (authentication).

The following subfunctions are used for defining the aforementioned functions exp-secure and imp-secure, which convert the security requirements when exporting/importing. Functions enc(key, data) and dec(key, data) decode/encode data data with the indicated key key. The function auth-check checks the authentication. It may consist, for example, of a PIN input (PIN—personal identification number). A function sig-make(key, data) signs the data with a key and returns the data with a signature. A function sig-check(key, data) checks the signature of the data with a key and returns the data without a signature. If the signature check fails, an exception is sent.

The following pseudo code defines the function exp-secure (x):
if auth-check=true then
    exp-secure=enc(enc-key,sig-make(sig-make-key,x))
else
    throw authentication-failed-exception.

The following pseudo code defines the function imp-secure (y):
if auth-check=true then
    imp-secure=sig-check(sig-check-key,dec(dec-key,y))
else
    throw authentication-failed-exception.

Owing to the combination with the aforementioned general export/import algorithm, the authentication is specifically for each personalization data element. As an alternative, the authentication may also be made prior to the commencement of the export/import, so that only one authentication event is necessary. In addition, as stated above, personalization data may be grouped so that a "coarse granular" or rather combined authentication is also achieved (analogous to the above addressed encoding of groups of personalization data).

There are a number of alternatives for a specific implementation. Two specific examples are described below.

Example 1

Asymmetrical Method and Public-Key-Infrastructure

In this case, RSA may be used as the method. In this case, the signature is made with the "private-key" of the exporting entity (vehicle or user); the encoding is done with the "public-key" of the destination entity (other vehicle or user).

The decoding is done at the destination entity with the "private-key" of the entity. The signature check is made with the public key of the source entity.

The key is exchanged between the source entity and the destination entity by way of the public-key-infrastructure. Both the source entity and the destination entity must be able to achieve this exchange by way of an on-line connection.

Example 2

Global Keys

In this case a symmetrical method for encoding and decoding, e.g., DES, as well as an asymmetrical method for digital signatures, e.g., RSA, are used as the methods. The source entity and the destination entity are the vehicles. All of the vehicles have the same symmetrical key sym-key for the symmetrical method and the same pairpub-key,priv-key for the asymmetrical method.

When exporting, the personalization data element is signed with the priv-key (RSA) and is encoded with the sym-key (DES). When importing, the respective data element is decoded with the sym-key (DES); and the signature is checked with the pub-key (RSA).

The drawback with this method is the limited security owing to the globally identical key. The advantage is that no on-line connection is necessary, not even for the first time, as in example 1, for the data exchange.

In both examples, the authentication may be carried out in that the user enters a PIN.

A smart card may be used for storing the keys, as in particular in the second example. In this case, the authentication of the card, e.g., by entering the PIN, and all crypto-algorithms are carried out on the card so that the keys do not leave the card.

The possibilities of exchanging the personalization data between vehicles are described in detail below with reference to FIG. 1.

The vehicle 100 has personalized and/or personalizable functions 1, 2, 3 etc., the personalization data of which are to be exchanged with another vehicle. The personalized functions are in particular comfort functions, audio functions, information functions, service functions, or suitable combinations of these functions or the like.

The personalized functions, or rather their personalization data, are retrieved by a coordination unit 5 with the aid of a bus system 4, provided in the vehicle, and ported in the described manner for transfer to the other vehicle. The ported personalization data are sent by way of the data bus 4 to an interface 6 between the vehicle and the "outside world." In the embodiment depicted in FIG. 1, the ported personalization data are stored by the interface 6 in a data carrier or a storage medium 7. The configuration depicted in FIG. 1 is also provided in the destination vehicle (not illustrated); and the ported personalization data, fed by way of the data carrier or the storage medium 7 to the destination vehicle, are made available in the destination vehicle.

The personalized functions 1, 2, 3, etc. may be made available, for example, by means of a software application on a computer or PC platform and/or by way of the controllers, which execute and contain the corresponding software and hardware.

The coordination unit 5 is preferably a software application, implemented centrally or decentrally, in the vehicle.

The interface 6 is preferably a Bluetooth, WLAN or mobile radio interface, like a GSM interface, UMTS interface, or the like.

The data carrier or storage medium 7 is a memory card, a PDA (personal digital assistant) a cell phone, an Internet platform, or preferably a service provided by the vehicle manufacturer, such as BMW Online.

Other Advantages of the Invention:

Ultimately, the method according to the invention makes it possible to offer the customer anywhere in the world a personalized vehicle that meets his comfort demands and inclinations, based on previous setting preferences (e.g., in an old vehicle at home or through a service provider such as a car rental company).

In this way, the user may pursue immediately his main goal of "driving" without having to make any complicated pre-settings. The time-consuming setting process in the (other) vehicle is no longer applicable to him, a feature that is especially advantageous, if he frequently changes his vehicle. Today, and especially in the future, when increasingly more functions will have to be set in the vehicle, this feature will play a role in enhancing customer benefits. At the same time, it raises the safety while driving, because the driver is less distracted.

It is also advantageous that the aforementioned method can be applied in such a scalable and flexible manner that as the functions of some or all vehicle models, belonging to the group of potential vehicles for the porting procedure, expand, the porting is very simple because the profile information is supplemented only as appropriate, thus avoiding the need of a conversion to the destination vehicle model as early as when exporting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transferring at least a first personal setting from a first vehicle to a second vehicle, the method comprising the acts of:
    exporting first personalization data indicating the first personal setting from the first vehicle in one of an original and modified forms, the first personalization data having dynamic personalization rules;
    importing the first personalization data into the second vehicle;
    forming second personalization data based on the imported first personalization data;
    causing a personal setting to be set dynamically in the second vehicle using the second personalization data and the imported dynamic personalization rules, whereby at least one of a model and accessories of the first and the second vehicle are identical or different.

2. The method according to claim 1, wherein the first personalization data is converted into a vehicle-independent data format, and further wherein the causing of the personal setting to be set in the second vehicle occurs using the data in the vehicle-independent data format.

3. The method according to claim 2, wherein the first personalization data is exported from the first vehicle in a form permitting the model of the first vehicle to be recognized, and further wherein the causing of the personal setting to be set in the second vehicle occurs with the aid of the data in the form that permits the model of the first vehicle to be recognized.

4. A system for transferring at least a first personal setting of a first vehicle to a second vehicle, wherein the system implements the method according to claim 2.

5. A computer program product for transferring at least a first personal setting of a first vehicle to a second vehicle, the computer program product including a computer readable medium containing a computer program that implements the method according to claim 2.

6. The method according to claim 1, wherein the first personalization data is exported from the first vehicle in a form permitting the model of the first vehicle to be recognized, and further wherein the causing of the personal setting to be set in the second vehicle occurs with the aid of the data in the form that permits the model of the first vehicle to be recognized.

7. A system for transferring at least a first personal setting of a first vehicle to a second vehicle, wherein the system implements the method according to claim 6.

8. A computer program product for transferring at least a first personal setting of a first vehicle to a second vehicle, the computer program product including a computer readable medium containing a computer program that implements the method according to claim 6.

9. The method according to claim 1, wherein the act of exporting the first personalization data further comprises the act of at least one of encoding and signing the exported first personalization data.

10. The method according to claim 9, wherein the encoding and signing are performed using a public-key method.

11. The method according to claim 10, wherein the first personalization data are combined with other personalization data into one group, the one group being then jointly at least one of encoded and signed.

12. The method according to claim 9, wherein the first personalization data are combined with other personalization data into one group, the one group being then jointly at least one of encoded and signed.

13. The method according to claim 1, further comprising the acts of:
    retrieving the first personalization data from at least one of a first controller of the first vehicle and a first central database provided in the first vehicle, prior to the exporting act; and
    feeding the second personalization data formed based on the first personalization data to at least one of a second controller of the second vehicle and a second central database provided in the second vehicle.

14. The method according to claim 1, wherein the act of forming the second personalization data is performed using at least one of a table, a matrix, and an allocation specification, which factors into account the model of the first and second vehicles, which models need not be identical.

15. The method according to claim 1, wherein the first personal setting is a personal setting for a driver who changes from the first vehicle to the second vehicle.

16. A system for transferring at least a first personal setting of a first vehicle to a second vehicle, wherein the system implements the method according to claim 1.

17. A computer program product for transferring at least a first personal setting of a first vehicle to a second vehicle, the computer program product including a computer readable medium containing a computer program that implements the method according to claim 1.

18. A method for transferring at least a first personal setting from a first vehicle to a second vehicle, the method comprising the acts of:

incorporating rules for dynamic personalization of the first vehicle in first personalization data;

exporting the first personalization data indicating the first personal setting from the first vehicle;

importing the first personalization data into the second vehicle;

forming second personalization data based on the imported first personalization data; and causing a personal setting to be dynamically set in the second vehicle using the imported dynamic personalization rules of the second personalization data.

19. The method according to claim 18, further comprising the acts of generating rules for dynamic personalization having a conditional expression related to data of at least one of the vehicle, environment and driver, and a vehicle function executable in response to a result of the conditional expression.

20. The method according to claim 18, further comprising the acts of interpreting the rules for dynamic personalization in the first vehicle to be applicable in the second vehicle.

* * * * *